Patented May 30, 1939

2,160,372

UNITED STATES PATENT OFFICE 2,160,372

FUEL-RESISTING MATERIAL

Hermann Stärk, Bad Soden, Germany, assignor to I. G. Farbenindustrie Aktiengesellschaft, Frankfort-on-the-Main, Germany No Drawing. Application July 17, 1936, Serial No. 91,233. In Germany July 25, 1935

3 Claims. (Cl. 260—87)

The present invention relates to fuel resisting materials.

Known liquid fuels, especially motor car fuels, consisting of a mixture of benzine with other combustible, similarly volatile liquids such as benzene and alcohol, have a very high dissolving power for a great number of crude materials for varnishes. Hence, for making lacquer coating which is to resist fuel, it does not suffice to use a crude material insoluble in benzine, of which materials there is a sufficient number; on the contrary, there must be used a crude material which is entirely insoluble in a mixture of the different agents which are used in an often varying proportion for making mixed fuels. In this direction neither the crude natural materials for varnishes nor the synthetically prepared materials have hitherto been satisfactory for not only must they be insoluble in the fuel mixture but also they must be soluble in certain solvents in order to provide the desired varnish. Hitherto there have been known only crude materials for varnishes which are insoluble in the fuel but are swollen by it, or are resistant to fuels but which have an inferior solubility in all other solvents in question. It has been proposed to use substances which as such do not resist fuel but become resistant by an aftertreatment.

Now I have found that polymeric vinylformiate and mixed polymerizates prepared with the aid of vinylformiate are very readily soluble in certain solvents, though in a very limited number, but are entirely insoluble and cannot swell in fuels, for instance in mixtures of benzene or also other aromatic hydrocarbons, or alcohol (methanol, ethanol) with benzine (aliphatic hydrocarbons) within the boiling range suitable for motor fuels, whatever the proportion in the mixture. As solvents for polyvinylformiate there may be used, for instance chlorinated hydrocarbons or ketones or mixtures of these liquids with each other or with certain quantities of other solvents. In the same manner polyvinylformiate and its mixed polymerizates may be worked to shaped masses, such as tubes, packing rings and so on, which may be employed as fuel resisting material.

It could not be foreseen that polyvinylformiate and its mixed polymerizates would have the properties of solubility described above. On the contrary it had to be supposed that they would have solubilities similar to those of other known polyvinylesters, above all the polyvinylacetate which is closely related to the polyvinylformiate. The polyvinylacetate is soluble nearly in all solvents, except the aliphatic hydrocarbons, and entirely unstable to fuels.

As mixed polymerizates there may be used, for instance, polymerizates of vinylformiate with vinylacetate, vinylpropionate, maleic acid dimethylester, maleic acid diethylester, acrylic acid ethylester, acrylic acid methylester, methacrylic acid ethylester. It is suitable that in the mixed polymerizates the vinylformiate radical is present in a proportion of at least 50 per cent because otherwise the resistance to fuels of the materials is diminished.

The polyvinylformiate used as starting material may be suitably prepared by heating the monomeric product for a prolonged time (for instance, about 20 hours) in a reflux apparatus at temperatures up to about 50° C. in the presence of peroxides such as hydrogen superoxide, benzoyl peroxide, oleic acid peroxide. In the preparation of mixed polymerizates the polymerization temperature may be correspondingly higher, for instance during the polymerization of a mixture of vinylformiate and vinylacetate at about 70° C.

Fuel resisting softening agents may be incorporated to the vinylformiate-polymerization products named in the specification and the examples therein, such softening agents are, for instance glycerine triformiate, glycerine-monoacetate and glycerine-di-acetate, the condensation products from ether-dicarboxylic acids, described in the co-pending application Serial No. 751,098, filed November 1, 1934, in the name of Hans Persiel, Gerhard Balle, Franz Grom and Rudolf Semmig, such as the condensation product from 1.3-butyleneglycol and diglycolic acid.

The following examples serve to illustrate the invention but they are not intended to limit it thereto:

(1) In order to provide the surfaces of articles of all kinds which come in contact with motor fuels, such as benzine casks, benzine tanks, rigid or elastic benzine tubes and the like, with a coating resistant to fuel, the surface is coated with a thin layer of polyvinylformiate, for instance by applying to the surface a solution of polyvinyl-formiate in acetone or methylenechloride or in a mixture of the two solvents.

In this manner a varnish coating of an extraordinary fastness to motor fuels is obtained. In consequence of the high elasticity of the polyvinylformiate this varnish coating is especially suitable for lending resistance to fuels to elastic and flexible tubes from caoutchouc vulcanizates or artificial materials.

(2) Polyvinylformiate is shaped with application of a raised pressure and a raised temperature so as to form tubes and other shaped bodies. Shaped pieces of a high elasticity and flexibility are obtained which on account of their absolute stability against motor fuels are especially suitable as benzine pipes or as elastic packing material which comes in contact with fuels.

I claim:

1. Devices for storing and conveying mixed liquid fuels containing an aliphatic hydrocarbon and at least one other component selected from the group consisting of aromatic hydrocarbons and aliphatic alcohols, at least the fuel contacting surfaces of said devices consisting of a fuel-resisting material comprising a polymerization product of vinyl formate.

2. Conduits for conveying mixed liquid fuels containing an aliphatic hydrocarbon and at least one other component selected from the group consisting of aromatic hydrocarbons and aliphatic alcohols, at least the fuel-contacting surfaces of said conduits consisting of a fuel-resisting material comprising a polymerization product of vinyl formate.

3. Devices for storing and conveying mixed liquid fuels containing an aliphatic hydrocarbon and at least one other component selected from the group consisting of aromatic hydrocarbons and aliphatic alcohols, at least the fuel-contacting surfaces of said devices consisting of a fuel-resisting material comprising a mixed polymerization product of vinyl formate and up to 50% of another unsaturated compound capable of being polymerized.

HERMANN STÄRK.